United States Patent [19]

Liu et al.

[11] Patent Number: 4,695,503

[45] Date of Patent: Sep. 22, 1987

[54] COATED, ORIENTED, POLYMER FILM LAMINATE

[75] Inventors: Leland L. Liu, Macedon; Robert E. Touhsaent, Fairport, both of N.Y.

[73] Assignee: Mobil Oil Corporation, New York, N.Y.

[21] Appl. No.: 837,116

[22] Filed: Mar. 7, 1986

[51] Int. Cl.$^4$ .................. B32B 3/14; B32B 27/08
[52] U.S. Cl. .................. 428/207; 428/200; 428/349; 428/461; 428/463; 428/510; 428/516; 428/910; 428/484; 428/288; 428/282; 428/518; 428/520; 428/327; 428/331; 264/176.1
[58] Field of Search .............. 428/461, 463, 510, 516, 428/349, 513, 200, 207

[56] References Cited

U.S. PATENT DOCUMENTS

| | | |
|---|---|---|
| 3,753,769 | 8/1973 | Steiner . |
| 3,922,469 | 11/1975 | Bayer ................................ 428/424 |
| 4,089,721 | 5/1978 | Sauder ............................. 428/537.1 |
| 4,125,662 | 11/1978 | Weiner et al. . |
| 4,230,767 | 10/1980 | Isaka et al. . |
| 4,235,365 | 11/1980 | Yoshii et al. . |
| 4,275,119 | 6/1981 | Weiner . |
| 4,275,120 | 6/1981 | Weiner . |
| 4,291,092 | 9/1981 | Weiner . |
| 4,297,411 | 10/1981 | Weiner . |
| 4,439,493 | 3/1984 | Hein et al. . |
| 4,447,494 | 5/1984 | Wagner, Jr. . |

FOREIGN PATENT DOCUMENTS 0002606 6/1979 European Pat. Off. .

*Primary Examiner*—P. C. Ives
*Attorney, Agent, or Firm*—Alexander J. McKillop; Michael G. Gilman; Charles J. Speciale

[57] ABSTRACT

A coated, oriented polymer film laminate is provided which comprises:

(a) an oriented core layer having an upper face and a lower face, said core layer being fabricated from a polypropylene homopolymer;

(b) an oriented, heat sealable layer applied to the lower face, and optionally, to the upper face, of core layer (a), said heat sealable layer being fabricated from a member of the group consisting of heat sealable copolymer or blend of copolymers, heat sealable blend of homopolymers and heat sealable blend of at least one copolymer and at least one homopolymer;

(c) a coating layer applied to the upper face of core layer (a), or, where heat sealable layer (b) has been applied thereto, to the exposed surface of said layer (b), said coating layer being derived from an interpolymer which is obtained from the interpolymerization of from about 0 to 15 parts by weight of an alpha-beta monoethylenically unsaturated carboxylic acid selected from the group consisting of acrylic acid, methacrylic acid and mixtures thereof with from about 85 to about 100 parts by weight of neutral monomer esters.

23 Claims, No Drawings

COATED, ORIENTED, POLYMER FILM LAMINATE

This invention relates to the field of laminated polymer films and, more particularly, to such films provided with coatings intended to impart special properties thereto such as sealablity, machinability, and the like, making the films especially suitable for packaging applications.

U.S. Pat. No. 3,753,769 describes an acrylic based terpolymer coating composition, adapted for use in coating polyolefin films, comprising an interpolymer of (a) from about 2 to about 15 parts by weight of an alpha-beta monoethylenically unsaturated carboxylic acid and (b) from about 85 to about 98 parts by weight of neutral monomer esters comprising an alkyl acrylate ester and an alkyl methacrylate ester. When applied to a suitable substrate film, e.g., oriented polypropylene, the foregoing coating composition confers hitherto unavailable properties on the film such as improving its heat seal properties while simultaneously improving its blocking characteristics, hot slip properties, stiffness, and optical properties. There is, however, no suggestion in U.S. Pat. No. 3,753,769 of applying the coating composition to a laminate.

U.S. Pat. Nos. 4,125,662; 4,230,767; 4,235,365; 4,275,119; 4,275,120; 4,291,092; 4,297,411;4,439,493; and, 4,447,494 each discloses a polymer structure including a base layer of oriented polypropylene and a surface, or skin, layer of an olefin copolymer, e.g., ethylene-propylene copolymer, in some cases blended with another olefin resin. There is no hint in these disclosures, however, of applying a coating composition such as described in U.S. Pat. No. 3,753,769, supra, to such structures.

SUMMARY OF THE INVENTION

In accordance with the present invention, a coated, oriented polymer film laminate is provided which comprises:

(a) an oriented core layer having an upper face and a lower face, said core layer being fabricated from a polypropylene homopolymer;

(b) an oriented, heat sealable layer applied to the lower face, and optionally, to the upper face, of core layer (a), said heat sealable layer being fabricated from a member of the group consisting of heat sealable copolymer or blend of copolymers, heat sealable blend of homopolymers and heat sealable blend of at least one copolymer and at least one homopolymer;

(c) a coating layer applied to the upper face of core layer (a), or, where heat sealable layer (b) has been applied thereto, to the exposed surface of said layer (b), said coating layer being derived from an interpolymer which is obtained from the interpolymerization of from about 0 to 15 parts by weight of an alpha-beta monoethylenically unsaturated carboxylic acid selected from the group consisting of acrylic acid, methacrylic acid and mixtures thereof with from about 85 to about 100 parts by weight of neutral monomer esters.

The foregoing polymer film is particularly useful in packaging applications where coating layer (a) contributes good heat sealability and machinability as well as other useful properties and oriented heat sealable layer (b) provides excellent wet-out and adhesion to water-based inks and other water-based coatings. In addition, when the exposed surface of heat sealable layer (b) is applied to a substrates such as another polymer film, a metal foil, paper, etc., through an adhesive, the presence of said heat sealable layer makes it possible to achieve significantly higher bond strengths between the polymer film laminate and the substrate compared to that which are attainable by applying the substrate directly to the lower face of polypropylene core layer (a).

DESCRIPTION OF THE PREFERRED EMBODIMENTS

The polypropylene homopolymer of the core layer (a) is preferably an isotactic polypropylene having a density of from 0.90 to 0.91 g/cc and a melt flow index of from 1 to 4 g/10 mins. at 230° C./2.16 Kp/cm$^2$ pressure (as measured in accordance with DIN 53 735). For present purposes, polypropylenes containing small amounts of other interpolymerized alpha-olefins such as 1-butene, e.g., not exceeding about 2 weight percent, are included within the expression "polypropylene homopolymer".

Heat sealable layer (b) which is applied to the lower face of core layer (a), and optionally, to the upper surface of core layer (a) as well, can be fabricated from any of the heat sealable copolymers, blends of homopolymers and blends of copolymer(s) and homopolymer(s) heretofore employed for this purpose. Illustrative of heat sealable copolymers which can be used in providing layer (b) of the present laminates are ethylene-propylene copolymers containing from about 1.5 to about 10, and preferably from about 3 to about 5, weight percent, ethylene and ethylene-propylene-butylene terpolymers containing from about 1 to about 10, and preferably from about 2 to about 6, weight percent ethylene and from about 80 to about 97, and preferably from about 88 to about 95, weight percent propylene. Heat sealable blends of homopolymers which can be utilized in providing layer (b) include from about 1 to about 99 weight percent polypropylene homopolymer, e.g., one which is the same as, or different from, the polypropylene homopolymer constituting core layer (a) blended with from about 99 to about 1 weight percent of a linear low density polyethylene (LDPE). Heat sealable blends of copolymer(s) and homopolymer(s) suitable for providing layer (b) include: a blend of from about 5 to about 19 weight percent of polybutylene and from about 95 to about 81 weight percent of a copolymer of propylene (80 to about 95 mole percent) and butylene (20 to about 5 mole percent); a blend of from about 10 to about 90 weight percent of polybutylene and from about 90 to about 10 weight percent of a copolymer of ethylene (2 to about 49 mole percent) and a higher olefin having 4 or more carbon atoms (98 to about 51 mole percent); a blend of from about 10 to about 90 weight percent poly butylene and from about 90 to about 10 weight percent of a copolymer of ethylene (10 to about 97 mole percent) and propylene (90 to about 3 mole percent); and, a blend of from about 90 to about 10 weight percent of polybutylene, and from about 10 to about 90 weight percent of a copolymer of propylene (2 to about 79 mole percent) and butylene (98 to about 21 mole percent).

Coating layer (c) is derived from any of the terpolymeric compositions disclosed in U.S. Pat. No. 3,753,769, the contents of which are incorporated by reference herein. These coating compositions contain as a film forming component a resin consisting essentially of an interpolymer of (a) from about 2 to about 15, and preferably from about 2.5 to about 6, parts by weight of an alpha-beta monoethylenically unsaturated carboxylic acid selected from the group consisting of acrylic acid, methacrylic acid, and mixtures thereof, and (b) from about 85 to about 98, and preferably from about 94 to about 97.5, parts by weight of neutral monomer esters, said neutral monomer esters preferably comprising (1) methyl acrylate or ethyl acrylate and (2) methyl methacrylate. The interpolymer compositions are further characterized by preferably comprising from about 30 percent to about 55 percent by weight of methyl methacrylate when said alkyl acrylate is methyl acrylate, and from about 52.5 percent to about 69 percent by weight of methylmethacrylate when said alkyl acrylate is ethyl acrylate. As more fully described infra, the coating compositions can be applied to the films herein in a variety of ways including in the form of ammoniacal solutions.

Similarly useful are copolymeric coating compositions prepared exclusively from the foregoing neutral monomer esters. These coating compositions are advantageously applied to the film laminates in the form of emulsions.

A variety of additives conferring special properties upon these coating compositions are advantageously incorporated therein. Thus, when the polymer film laminate of this invention is utilized in packaging, a "hot slip" agent, i.e., a material which improves the coefficient of friction of the film at the elevated temperatures encountered in heat sealing operations, can be present as a component of the coating layer. Suitable hot slip agents include finely divided (e.g., from about 10 to about 200 millimicrons) silicas, diatomaceous earth, calcium silicate, bentonite, clay, etc., at a level of from about 30 to about 60, and preferably from about 35 to about 45, weight percent of interpolymer. Anti-blocking agents, i.e., materials which counteract the tendency of film to adhere to itself, many of which also serve to reduce the coefficient of friction of coating layer (a), constitute another useful type of additive. Numerous wax and wax-like materials are known to function as anti-blocking agents. Representative of such materials are (a) the vegetable waxes, e.g., carnauba which is preferred, quericury, palm, raffia, cocoa, candelilla, rhimba, ocoxilla, banana, esparto, flax, hemp, cottonseed, kapok, sugar cane, banaboo leaf, bayberry, ucuhuba, Japan, cocoa butter, fiber, reed, ocuba, godang, blanophore waxes, ets.; (b) the animal waxes, e.g., lanolin, spermaceti, beeswax, stearic acid, Chinese insect wax, shellac wax, etc.; (c) the mineral waxes, e.g., ozokerite, Montan, Utah, paraffin, ceresin, microcrystalline, petrolatum, etc.; (d) the artificial waxes including those obtained from the distillation of paraffin base petroleum, ozokerite, and from the destruction distillation of lignite and parafinaceous shales, e.g., peat wax, and the like; (e) the synthetic and manufactured waxes which include the fatty alcohols, e.g., cetyl alcohol, stearyl alcohol and other alcohols derived from fatty acids, and the like; esters of higher alcohols and fatty acids including esters of cetyl alcohol, stearyl alcohol, and the like, with stearic acid, palmitic acid, and the like; fatty acids including stearic, palmitic, myristic, and other fatty acids derived from tallow, cottonseed oil, coconut oil and soybean oil; glycerol esters such as glycerol tri-stearate, glycol distearate and glycerol monostearate, and the like; the mono- and di- fatty acid esters of glycols such as ethylene glycol mono- and di-stearate, diethylene glycol mono- and di-palmitate, propylene glycol mono-and di-stearate, and the sorbitol stearates, the pentaerythritol stearates, the polypentaerythritol fatty acid esters, and the like; hydrogenated and partially hydrogenated fatty oils such as cottonseed, coconut, peanut, soybean, castor, fish whale and other vegetable and/or animal oils, and the like; the polyglycols generally having a molecular weight greater than about 500 (e.g. the Carbowaxes), and the like; the chlorinated naphthalenes, and the like; complex nitrogen derivatives of higher fatty acids, and the like; glycerine and glycol esters of acids derived from Montan wax, and the like; waxy ketones, amines, amides and nitriles such as 16-hentriacontanone, octadecyl-hexadecyl amine, higher molecular weight aliphatic amides, octadecanamide, hexadecanamide, octadecane nitrile, hexadecane nitrile, and the like; solid hydrocarbons with melting points up to 210° C., e.g., polyethylene wax, and wax-like polymerization products of one or more alpha-olefins, and the like; oxidized paraffin or microcrystalline waxes, and the like; and mixtures of two or more of the foregoing.

In addition to functioning as anti-blocking agents, the above-described wax and wax-like materials also function to improve the "cold-slip" properties of the films coated therewith, i.e., the ability of a film to satisfactorily slide across surfaces at ambient temperatures. Only a minor amount of such materials, generally on the order of from about 1.5 to about 10, and preferably from about 3 to about 6, weight percent by total weight of coating composition need be employed for good results.

Before applying the coating composition to the appropriate substrate, the upper surface of core layer (a), or where heat sealable layer (b) is optionally present thereon, the exposed surface of the latter layer, is treated to insure that the coating will be strongly adherent thereto thereby eliminating the possibility of the coating peeling or being stripped from the film laminate. This treatment can be accomplished employing known techniques such as, for example, film chlorination, i.e., exposure of the film surface to gaseous chlorine, treatment with oxidizing agents such as chromic acid, hot air or steam treatment, flame treatment and the like. Although any of these techniques is effectively employed to pretreat the film surface, a particularly desirable method of treatment has been found to be the so called electronic treatment method which comprises exposing the film surface to a high voltage corona discharge while passing the film between a pair of spaced electrodes. After electronic treatment of the film surface, the coating composition is then applied thereto.

In applications where even greater coating-to-film adherence is desired, i.e., greater than that resulting from treatment of the film surface by any of the aforediscussed methods, an intermediate primer coating can be employed to increase the adherence of the coating composition to the film. In this case, the film is first treated by one of the foregoing methods, electronic treatment being a preferred method, to provide increased active adhesive sites thereon (thereby promoting primer adhesion) and to the thus treated film surface there is subsequently applied a continuous coating of a primer material. Such primer materials are well known in the prior art and include, for example, titanates and poly(ethylene imine). A particularly effective primer coating for purposes of the present invention is poly(ethylene imine). The imine primer provides an overall adhesively active surface for thorough and secure bonding with the subsequently applied coating composition. The primer is applied to the electronically treated base film by conventional solution coating means, for example, by mating roller application. An effective coating solution concentration of the poly(ethylene imine) applied from either aqueous or organic solvent media such as ethanol, for example, is a solution comprising about 0.5 percent by weight of the poly(ethylene imine).

Extrusion coating and coextrusion are two types of well known methods by which the coating composition can be applied to the polymer film laminate herein to provide layer (c) thereof. For example, when extrusion coating is used, the polymer film laminate, itself advantageously a product of coextrusion, is stretched in the machine direction, extrusion coated with the coating composition and then stretched perpendicularly in the transverse direction. When coextrusion is utilized, the polymer film laminate is coextruded with the coating composition and the entire structure is then oriented, preferably by biaxial stretching.

It is also possible to apply the coating composition onto the desired surface of the polymer film laminate as a solution, e.g., one prepared with an organic solvent such as an alcohol, ketone, ester, etc. However, since the coating composition can contain insoluble, finely divided inorganic materials which are difficult to keep well dispersed in organic solvents, it is preferable that the coating composition be applied from aqueous media and preferably from an alkaline aqueous solution thereof. The solution of terpolymer, preferably in an alkaline aqueous solution such as an ammoniacal solution, is applied to the treated surface of core layer (a) (or optional heat sealable layer (b) as the case may be) in any convenient and known manner, such as by gravure coating, roll coating, dipping, spraying, etc. The excess aqueous solution can be removed by squeeze rolls, doctor knives, etc.

The coating composition should be applied in such amount that there will be deposited upon drying a smooth, evenly distributed layer, generally on the order of from about 0.01 to about 0.08 mils thickness (equivalent to about 0.2 to 1.6 grams per 1,000 sq. in. of film). In general, the thickness of the applied coating is such that it is sufficient to impart the desired heat sealability and stiffness characteristics to the base film structure.

The coating on the film, as exemplified by use of an ammoniacal solution of the terpolymer, is subsequently dried by hot air, radiant heat or by any other convenient means. Upon drying, ammonia is evolved leaving a non-water soluble, clear, adherent, glossy coated film useful, for example, as a packaging film.

The total thickness of the polymer film laminate of this invention, and the thickness of the individual layers comprising same, are not critical and will be selected to meet particular service requirements. So, for example, when used in packaging, the total thickness of the oriented laminate structure can be on the order of from about 0.3 to about 2 mils, with core layer (a) representing about 90 percent of the total, heat sealable layer(s) (b) representing about 5 percent of the total and coating layer (a) comprising the balance.

While layers (a), (b) and (c) constituting the polymer film laminate herein can be individually extruded and thereafter brought together to provide the finished laminate, it is preferable to coextrude at least two of the layers, e.g., layers (a) and (b), and still more preferable to coextrude all three layers, since coextrusion represents the simplest and most efficient technique for providing the laminate.

Orientation of core layer (a) and heat sealable layer(s) (b) is achieved by stretching the film utilizing any of the procedures and equipment known to accomplish this. For example, a coextruded laminate of layers (a), (b) and (c) can initially be stretched in the machine direction for from four to eight times and in a transverse direction from four to eight times at a drawing temperature of from about 100° C. to about 160° C. employing commercially available sequential biaxial orientation apparatus.

The coated oriented polymer film laminate of this invention can be bonded through the exposed surface of heat sealable layer (b) to a wide variety of substrate materials including polymer films/laminates; metal foil, e.g., of aluminum; cellulosic webs, e.g., numerous varieties of paper such as corrugated paperboard, kraft paper, glassine, cartonboard, etc.; non-woven tissue, e.g., spunbonded polyolefin fiber, melt-blown microfibers, etc., employing a suitable adhesive, e.g., a hot melt adhesive such as low density polyethylene, ethylene-methacrylate copolymer, water-based adhesive such as polyvinylidene chloride latex, and the like.

Surprisingly, it has been found that the bond strengths between laminate and substrate are significantly higher with the aforedescribed arrangement than those obtained by bonding the substrate directly to polypropylene homopolymer. Prior treatment of heat sealable layer (b), e.g., priming, is not required to provide good adhesion and as such will ordinarily be dispensed with. It has further been observed that the wet out and adhesion values of water based coatings, e.g., water-based inks, applied to the exposed surface of heat sealable layer (b) are comparable to those obtained with the identical water-based coating which has been applied to a specially prepared film surface, e.g., a film possessing a coating composition as previously described serving as the water-based coating-receiving surface.

The following examples further illustrate the polymer film laminate of this invention.

EXAMPLES 1-6

Known and conventional coextrusion techniques were employed in preparing a number of coated, oriented polymer film laminates within the scope of this invention and, for comparison purposes, coated, oriented polymer film/laminates outside the scope of the invention. In the case of those films which were further laminated to a substrate, a coextruded layer of hot melt polymeric adhesive was applied to the lower face of the composite film. Coating composition (a) was uniformly applied to all of the films by means of a gravure roll coater. The coated films were subsequently oriented seven and one-half times using a commercially available sequential biaxial orienting apparatus.

In the table below, the following symbols/terms have the meanings indicated:

A: Terpolymer coating composition in accordance with U.S. Pat. No. 3,753,769 prepared from 4 weight percent methacrylic acid, 45 weight percent methyl acrylate, balance methyl methacrylate, containing 28 weight percent colloidal silica, 3.5 weight cananba wax PP: Polypropylene homopolymer of 4 gm/10 min melt flow, 96 weight percent isotacticity EP: Ethylene-propylene copolymer containing about 3 weight percent ethylene PE: Low density polyethylene EMA/LDPE: 30 weight percent ethylene-methacrylate acid copolymer containing about 90 weight percent ethylene with 70 weight percent low density polyethylene PXS: Polyvinylidene chloride-coated oriented polypropylene Glassine: Polyvinylidene chloride-coated glassine AF: Aluminum foil Board: Paperboard Ink: Water-based white ink In Examples 1 to 5, coated, oriented film laminates within and outside the scope of the invention were bonded to a variety of substrates employing two different polymeric adhesives and the lamination bond strengths of the laminates were measured employing standard procedures. In Example 6, a coated, oriented polymeric film laminate prepared in accordance with this invention was provided with a coating of water-based ink applied to the exposed surface of its heat sealable layer (b) and the wet out and adhesion properties of the ink were compared with those obtained for a coated, oriented film in which the water-based ink was superimposed upon a layer of coating composition A. The structures of the various films and the results of the foregoing measurements are set forth in the Table below.

TABLE

| | | Film Properties | | | | | |
|---|---|---|---|---|---|---|---|
| Example | Film | Total Film Thickness (mills) | Polymer Adhesive | Substrate/ Coating | Lamination Bond Strength (g/in.) | Wet Out (%) | Adhesion (%) |
| 1(a)* | A/EP/PP | 0.57 | PE | PXS | 56 | — | — |
| 1(b) | A/PP/EP | 0.57 | PE | PXS | 79 | — | — |
| 2(a)* | A/EP/PP | 0.57 | PE | Glassine | 32 | — | — |
| 2(b) | A/PP/EP | 0.57 | PE | Glassine | 54 | — | — |
| 3(a)* | A/EP/PP | 0.57 | EMA/LDPE | PXS | 354 | — | — |
| 3(b) | A/PP/EP | 0.57 | EMA/LDPE | PXS | 820 | — | — |
| 4(a)* | EP/PP/A | 0.57 | PE | AF | 12 | — | — |
| 4(b)* | A/EP/PP | 0.57 | PE | AF | 22 | — | — |
| 4(c) | A/PP/EP | 0.57 | PE | AF | 34 | — | — |
| 5 | A/PP/EP | 0.57 | PE | Board | 750 | — | — |
| 6(a) | A/PP/EP | 0.57 | — | Ink | — | 90 | 100 |
| 6(b)* | A/PP/A | 0.75 | — | Ink | — | 90 | 100 |

*Film is outside the scope of this invention.

These date (Examples 1-5) demonstrate that in every case where a substrate was bonded to a heat sealable layer (b) rather than directly to polypropylene homopolymer core layer (a), the resulting lamination strength was significantly higher in the case of the former compared with that of the latter. The data also show (Example 6) that the wet out and adhesion values of ink applied to the heat sealable layer (b) of this invention were substantially the same as the values obtained for a film possessing a specially prepared ink-receptive coating.

What is claimed is:

1. A coated, oriented polymer film laminate which comprises:
   (a) an oriented core layer having an upper face and lower face, said core layer being fabricated from polypropylene homopolymer;
   (b) an oriented, heat sealable layer applied to the lower face, and optionally, to the upper face, of core layer (a), said heat sealable layer being fabricated from a member of the group consisting of heat sealable copolymer or blend of copolymers, heat sealable blend of homopolymers and heat sealable blend of at least one copolymer and at least one homopolymer;
   (c) a coating layer applied to the upper face of core layer (a), or, where heat sealable layer (b) has been applied thereto, to the exposed surface of said layer (b), said coating layer being derived from an interpolymer which is obtained from the interpolymerization of from about 0 to 15 parts by weight of an alpha-beta monoethylenically unsaturated carboxylic acid selected from the group consisting of acrylic acid, methacrylic acid and mixtures thereof with from about 85 to about 100 parts by weight of neutral monomer esters; and,
   (d) an adhesively bonded substrate or a water-based coating composition applied directly to the exposed, untreated surface of heat sealable layer (b) applied to the lower face of core layer (a).

2. The polymer film laminate of claim 1 wherein core layer (a) is fabricated from an isotactic polypropylene.

3. The polymer film laminate of claim 1 wherein heat sealable layer (b) is fabricated from an ethylene-propylene copolymer containing from about 1.5 to about 10 weight percent ethylene.

4. The polymer film laminate of claim 1 wherein heat sealable layer (b) is fabricated from an ethylene-propylene copolymer containing from about 3 to about 5 weight percent ethylene.

5. The polymer film laminate of claim 1 wherein heat sealable layer (b) is fabricated from an ethylene-propylene-butylene terpolymer containing from about 1 to about 10 weight percent ethylene and from about 80 to about 97 weight percent propylene.

6. The polymer film laminate of claim 1 wherein heat sealable layer (b) is fabricated from an ethylene-propylene-butylene terpolymer containing from about 2 to about 6 weight percent ethylene and from about 88 to about 95 weight percent propylene.

7. The polymer film laminate of claim 1 wherein heat sealable layer (b) is fabricated from a blend of from about 1 to about 99 weight percent polypropylene homopolymer and from about 99 to about 1 weight percent linear low density polyethylene.

8. The polymer film laminate of claim 1 wherein heat sealable layer (b) is fabricated from a blend of from about 5 to about 19 weight percent of polybutylene and from about 95 to about 81 weight percent of a propylene-butylene copolymer.

9. The polymer film laminate of claim 1 wherein heat sealable layer (b) is fabricated from a blend of from about 10 to about 90 weight percent polybutylene and from 90 to about 10 weight percent of a copolymer of ethylene and an alpha olefin having at least 4 carbon atoms.

10. The polymer film laminate of claim 1 wherein heat sealable layer (b) is fabricated from a blend of from about 10 to about 90 weight percent polybutylene and from about 90 to about 10 weight percent of an ethylene-propylene copolymer.

11. The polymer film laminate of claim 1 wherein heat sealable layer (b) is fabricated from a blend of from about 90 to about 10 weight percent polybutylene and from about 10 to about 90 weight percent of a propylene-butylene copolymer.

12. The polymer film laminate of claim 1 wherein coating layer (c) is derived from an interpolymer which is obtained from the interpolymerization of from about 2.5 to about 6 parts by weight of alpha-beta monoethylenically unsaturated carboxylic acid with from about 94 to about 97.5 parts by weight of neutral monomer esters.

13. The polymer film laminate of claim 1 wherein coating layer (c) is derived from an interpolymer which is obtained from the interpolymerization of alpha-beta monoethylenically unsaturated carboxylic acid and neutral monomer esters comprising methyl acrylate or ethyl acrylate and methyl methacrylate.

14. The polymer film laminate of claim 1 wherein coating layer (c) is derived from an interpolymer which is obtained from the interpolymerization of alpha-beta ethylenically unsaturated carboxylic acid and neutral monomer esters comprising methyl acrylate and from about 30 percent to about 55 percent by weight of methyl methacrylate.

15. The polymer film laminate of claim 1 wherein coating layer (c) is derived from an interpolymer which is obtained from the interpolymerization of alpha-beta ethylenically unsaturated carboxylic acid and neutral monomer esters comprising ethyl acrylate and from about 52 to about 69 percent by weight of methyl methacrylate.

16. The polymer film laminate of claim 1 wherein coating layer (c) is derived from the interpolymerization of 100 parts by weight of neutral monomer esters comprising methyl acrylate or ethyl acrylate and methyl methacrylate.

17. The polymer film laminate of claim 1 wherein coating layer (c) contains a hot slip agent.

18. The polymer film laminate of claim 1 wherein coating layer (c) contains an anti-blocking agent.

19. The polymer film laminate of claim 1 wherein coating layer (c) contains a cold slip agent.

20. The polymer film laminate of claim 1 wherein substrate (d) is selected from the group consisting of polymer film, polymer film laminate, metal foil, cellulosic web and non-woven tissue.

21. The polymer film laminate of claim 1 wherein substrate (d) is adhesively bonded through a hot melt polymeric adhesive to the exposed surface of heat sealable layer (b) applied to the lower face of core layer (a).

22. The polymer film laminate of claim 1 wherein substrate (d) is adhesively bonded through a hot melt polymeric adhesive selected from the group consisting of low density polyethylene and ethylene-methacrylic acid copolymer to the exposed surface of heat sealable layer (b) applied to the lower face of core layer (a).

23. The polymer film laminate of claim 1 wherein water-based coating composition (d) is a water-based ink.

* * * * *